(12) United States Patent
Yoo et al.

(10) Patent No.: US 11,872,893 B2
(45) Date of Patent: Jan. 16, 2024

(54) PROPULSION SYSTEM WITH ROTOR POSITION ESTIMATION BASED ON VOLTAGE SIGNAL

(71) Applicants: GM GLOBAL TECHNOLOGY OPERATIONS LLC, Detroit, MI (US); Seoul National University, Seoul (KR)

(72) Inventors: Anno Yoo, Rochester, MI (US); Seung-Ki Sul, Seoul (KR); Hyung-June Cho, Seoul (KR)

(73) Assignees: GM Global Technology Operations LLC, Detroit, MI (US); Seoul Nathional University, Seoul (KR)

( * ) Notice: Subject to any disclaimer, the term of this patent is extended or adjusted under 35 U.S.C. 154(b) by 175 days.

(21) Appl. No.: 17/719,819

(22) Filed: Apr. 13, 2022

(65) Prior Publication Data
US 2023/0331094 A1    Oct. 19, 2023

(51) Int. Cl.
*B60L 15/20*    (2006.01)
*H02P 23/14*    (2006.01)

(52) U.S. Cl.
CPC .............. *B60L 15/20* (2013.01); *H02P 23/14* (2013.01)

(58) Field of Classification Search
CPC .. B60L 15/20; B60L 15/025; B60L 2240/421; B60L 2240/427; B60L 2240/429; B60L 3/12; B60L 3/0038; H02P 23/14; H02P 21/18
USPC .......................................................... 701/74
See application file for complete search history.

(56) References Cited

FOREIGN PATENT DOCUMENTS

| JP | 3898107 | * 3/2007 | ............. B60K 6/445 |
|---|---|---|---|
| WO | WO 2021216927 | * 10/2021 | ............. B63H 21/36 |

* cited by examiner

*Primary Examiner* — Hai H Huynh
(74) *Attorney, Agent, or Firm* — Quinn IP Law

(57) ABSTRACT

A propulsion system for a device includes an electric motor configured to generate torque to propel the device. A position sensor is adapted to determine a rotor position of the electric motor. The system includes a controller having instructions recorded for determining the rotor position when a sensor fault condition is detected. The controller is adapted to selectively command injection of a voltage signal in a direct magnetic axis in a synchronous reference frame when a motor speed of the electric motor is below a predefined motor speed threshold and the sensor fault condition is detected. The rotor position is estimated based in part on a motor current response to the voltage signal. The voltage signal is defined by an alternating periodic shape having respective constant segments in each of a plurality of control periods, the respective constant segments being discontinuous between the control periods.

19 Claims, 3 Drawing Sheets

PROPULSION SYSTEM WITH ROTOR POSITION ESTIMATION BASED ON VOLTAGE SIGNAL

INTRODUCTION

The disclosure relates generally to a propulsion system for a device having an electric motor. More specifically, the disclosure relates to estimating the rotor position of the electric motor based on an injected voltage signal. The parameters representing the internal state of a system are needed to achieve a number of goals, such as stabilizing the system using internal state feedback. For example, the position of the rotor is useful for synchronizing operation of the electric motor. When a three-phase AC motor is in operation, the stator winding current vector needs to be synchronized with the rotor position, which is used to drive the motor output speed and torque. The internal state of a system may be obtained from measurements provided by a sensor or state observer. However, direct and/or accurate observation of the internal state may not be possible in some instances.

SUMMARY

Disclosed herein is a propulsion system for a device having an electric motor configured to generate torque to propel the device, the electric motor including a stator and a rotor. A position sensor (e.g., a resolver, encoder, inductive sensor etc.) is adapted to determine a rotor position of the electric motor. The system includes a controller having a processor and tangible, non-transitory memory on which instructions are recorded for determining the rotor position when a sensor fault condition in the position sensor is detected. The controller is adapted to determine a motor speed of the electric motor. When the motor speed is below a predefined motor speed threshold and the sensor fault condition is detected, the controller is adapted to selectively command injection of a voltage signal in a direct magnetic axis in a synchronous reference frame. The rotor position is estimated based in part on a motor current response to the voltage signal. The voltage signal is defined by an alternating periodic shape having a respective constant segment in each of a plurality of control periods, the respective constant segment being discontinuous between the control periods.

Operation of the electric motor is controlled based in part on the rotor position. The voltage signal has a zero-magnitude signal in a quadrature magnetic axis in the synchronous reference frame. The alternating periodic shape of the voltage signal may have a partially sinusoidal shape. In one embodiment, the predefined motor speed threshold may be between 10% and 20% of a maximum speed of the electric motor. The predefined motor speed threshold may be about 15% of a maximum speed of the electric motor.

The electric motor defines a switching frequency, and a maximum frequency of the voltage signal is one-sixth of the switching frequency. A current sensor is in communication with the controller and adapted to measure the motor current response. The controller may be adapted to add a one-sample delay in pulse width modulation generation in the electric motor, thereby affecting the motor current response. A filter may be operatively connected to the electric motor and adapted to receive the motor current response, the filter being a band stop filter and/or a notch filter.

Disclosed herein is a method of operating a propulsion system in a device, the propulsion system having an electric motor with a stator, a rotor, a position sensor, and a controller having a processor and tangible, non-transitory memory. The method includes determining if a sensor fault condition in the position sensor has been detected and a motor speed of the electric motor. The method includes commanding injection of a voltage signal in a direct magnetic axis of a synchronous reference frame when the motor speed is below a predefined motor speed threshold and the sensor fault condition is detected. The voltage signal is selected to have an alternating periodic shape with respective constant segments in each of a plurality of control periods, the respective constant segments being discontinuous between the plurality of control periods. The method includes estimating the rotor position based in part on a motor current response to the voltage signal.

The above features and advantages and other features and advantages of the present disclosure are readily apparent from the following detailed description of the best modes for carrying out the disclosure when taken in connection with the accompanying drawings.

Figure 1:
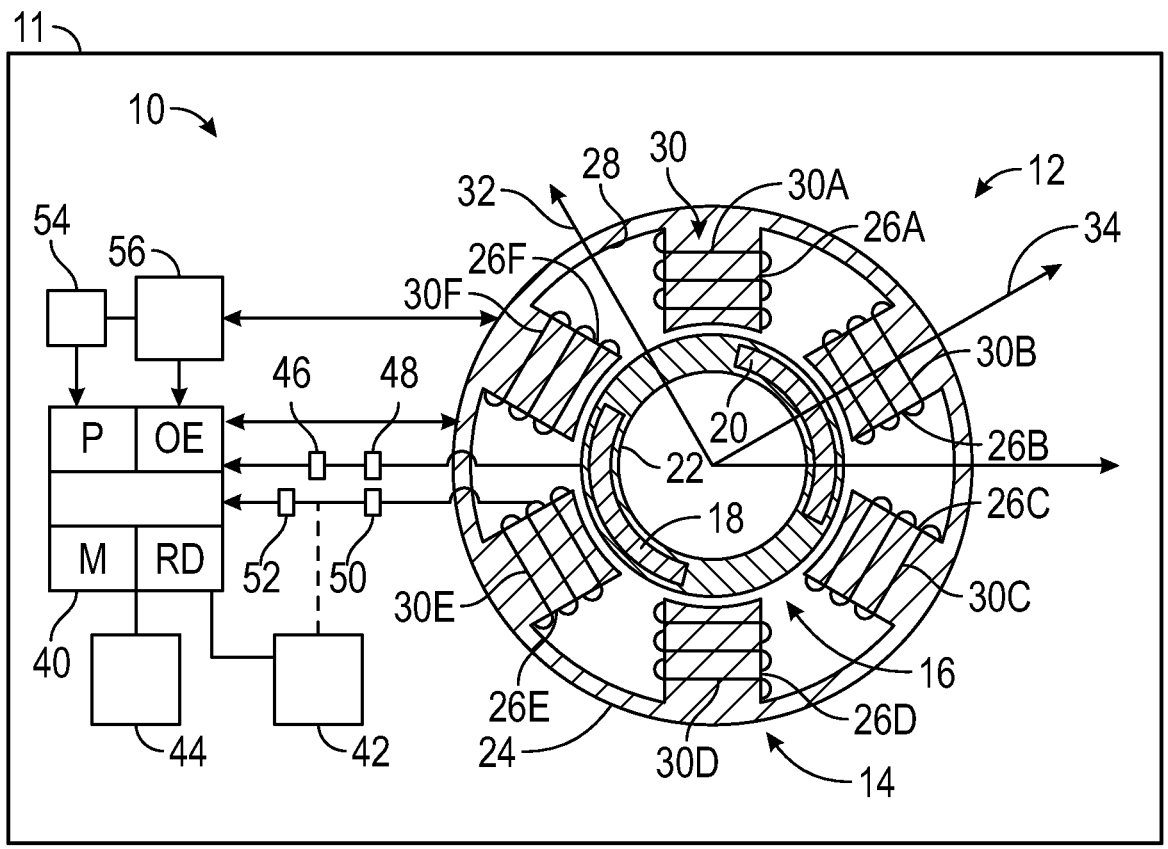
FIG. 1 is a schematic fragmentary partly sectional view of a propulsion system for a device having an electric motor and a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a propulsion system 10 for a device 11. The device 11 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other device. The device 11 may take many different forms and include multiple and/or alternate components and facilities.

Referring to FIG. 1, the device 11 includes an electric motor 12 having a stator 14, and a rotor 16 which includes at least one permanent magnet. The rotor 16 may include a first permanent magnet 18 and a second permanent magnet 20 of alternating polarity around the outer periphery of a rotor core 22. The rotor 16 may include as many permanent magnets as required per the application; for simplicity two are shown. The rotor 16 defines a rotor electrical speed ($\omega_e$) and a rotor mechanical frequency ($\omega_m$), which are related as ($\omega_e = (P/2) * \omega_m$), where P is the number of pole pairs. While the embodiment shown in FIG. 1 illustrates a three-phase, single pole pair (i.e. two poles) machine, it is understood that the number of phases or pole pairs may be varied.

Referring to FIG. 1, the stator 14 includes a stator core 24 which may be cylindrically shaped with a hollow interior. The stator core 24 may include a plurality of inwardly protruding stator teeth 26A-F, separated by gaps or slots 28. In the embodiment shown in FIG. 1, stator windings 30 may be operatively connected to the stator core 24, such as for example, being coiled around the stator teeth 26A-F. The electric motor 12 may include, but is not limited to, synchronous machines. While an example electric motor 12 is shown, the components illustrated in the FIG. are not intended to be limiting. Indeed, additional or alternative components and/or implementations may be used.

The stator 14 is configured to have electric current, referred to herein as stator current, flowing in the stator windings 30 and causing a rotating magnetic field in the stator 14. Referring to FIG. 1, the stator windings 30 may include six sets of windings; one set for each of three phases (the first phase through stator windings 30A and 30D, the second phase through stator windings 30B and 30E and the third phase through stator windings 30C and 30F). Alternatively, slip rings or brushes (not shown) may be employed. Referring to FIG. 1, a quadrature magnetic axis 32 (referred to herein as q-axis 32) and a direct magnetic axis 34 (referred to herein as d-axis 34) are shown. The first and second permanent magnets 18, 20 aid in the creation of a magnetic field and magnet flux linkage.

Referring to FIG. 1, the propulsion system 10 includes a controller 40 in communication, such as electronic communication, with the electric motor 12. Referring to FIG. 1, the controller 40 may include an online torque estimation module OE and a resolver fault detection module RD. The electric motor 12 is configured to generate torque to propel the device 11, for example, through one or more wheels 42. The propulsion system 10 may include a secondary source 44, such as an internal combustion engine, configured to selectively provide a secondary torque contribution to propel the device 11, through the wheels 42, for example.

Referring to FIG. 1, the propulsion system 10 includes a position sensor 46, such as a resolver, encoder, inductive sensor or other type of detectors available to those skilled in the art. The signal from the position sensor 46 provides the rotor position information which is needed in many three-phase motor controls system. In case of position sensor fault, the motor control cannot maintain the torque control capability and loss of propulsion may occur in the vehicle 12. The controller 40 includes at least one processor P and at least one memory M (or non-transitory, tangible computer readable storage medium) on which are recorded instructions for executing a method 100, shown in FIG. 3, for determining the rotor position. The memory M can store controller-executable instruction sets, and the processor P can execute the controller-executable instruction sets stored in the memory M.

The system 10 is adapted to allow the torque controls at low speed, including zero speed in the event that a sensor fault condition is detected, by injecting a specific voltage signal V (see FIG. 2) into the motor control system. The voltage signal V is injected in the d-axis 34 in the synchronous reference frame while zero voltage is injected in the q-axis 32. The injected voltage changes the shape of motor phase current according to the rotor position. The rotor position information is then calculated by the controller 40. The frequency of the injected voltage may be increased up to ⅙ of the switching frequency. In one example, the switching frequency is about 10 kHz.

In motor controls system, the switching frequency may be limited due to the nature of digital control system. In order to decouple interference between rotor angle detection and fundamental torque control, it may be useful to increase the frequency of injected voltage in a scenario where the position sensor 46 is not available. The system 10 improves the accuracy of rotor position estimation and enhances torque control performance, in terms of maximum torque capability and torque control dynamics.

The controller 40 of FIG. 1 is specifically programmed to execute the blocks of the method 100 (see FIG. 3) and may receive inputs from one or more sensors. Referring to FIG. 1, the propulsion system 10 may include a rotor temperature sensor 48, a current sensor 50, a magnet flux linkage observer 52, each capable of measuring a respective physical factor and sending a respective signal to the controller 40. As alternative to physical sensors, virtual software replacements may be used. Additionally, controller 40 may be programmed to determine the respective physical factors by inputting the respective signals into a model or other estimation technique available to those skilled in the art. Referring to FIG. 1, a direct current (DC) power source 54 is configured to provide a DC link voltage ($V_{dc}$) to the electric motor 12. A pulse width modulated (PWM) inverter 56 may be operatively connected to the controller 40 (and the DC power source 54) and configured to convert DC current to alternating (AC) current.

Figure 3:
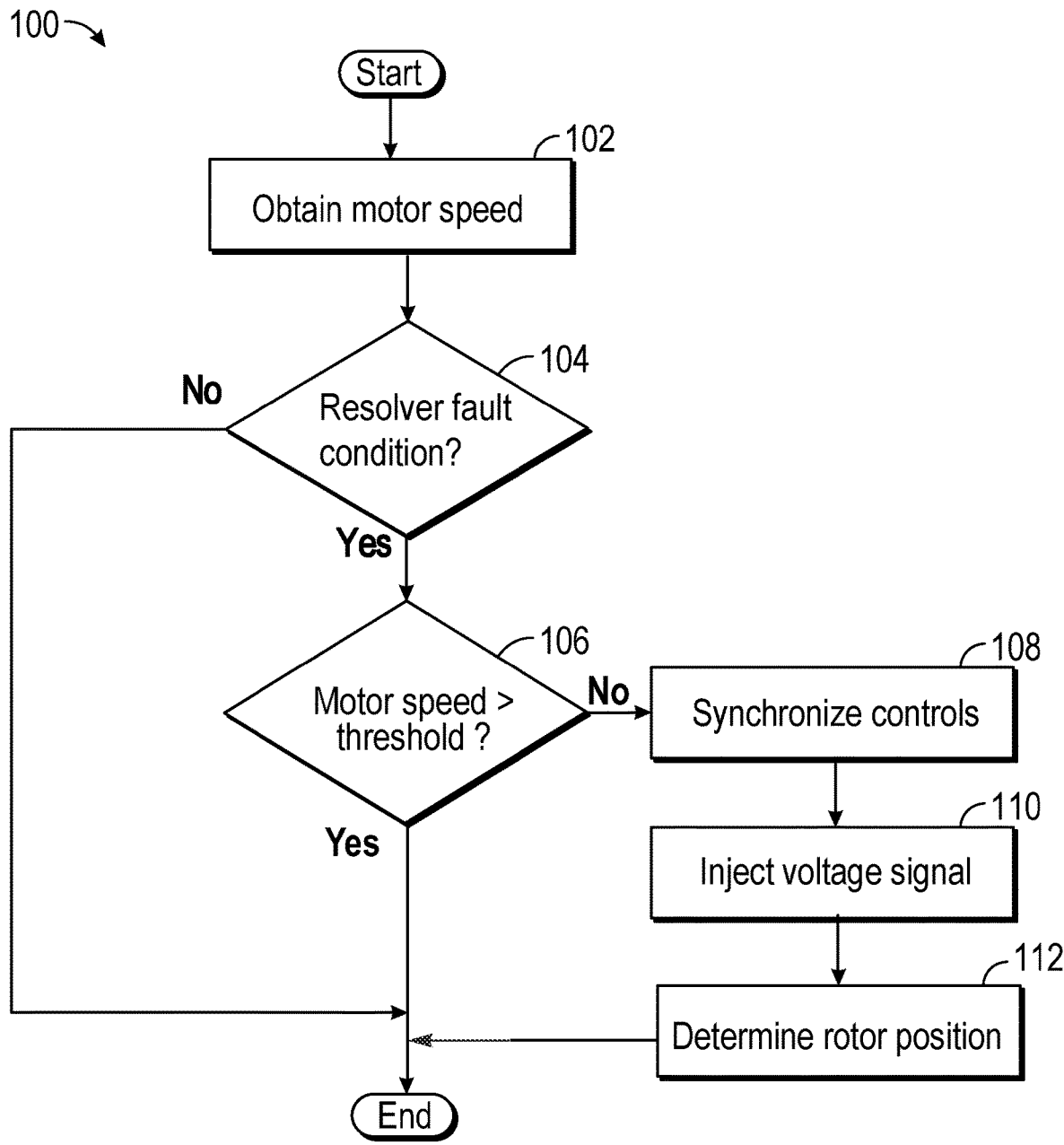
FIG. 3 is a flowchart for a method executable by the controller of FIG. 1.

Referring now to FIG. 3, an example flowchart of the method 100 is shown. Method 100 may be embodied as computer-readable code or instructions stored on and partially executable by the controller C of FIG. 1. Method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 3, the method 100 includes determining a motor speed of the electric motor 12, via a physical sensor and/or virtual software replacements. Advancing to block 104 of FIG. 3, the controller 40 is programmed to determine if there is a sensor fault condition. This may be done through a separate module, such as a position sensor fault detection module RM. If not (block 104=NO), the method 100 is ended. If a sensor fault condition is detected (block 104=YES), the method 100 proceeds to block 106.

Per block 106, the controller 40 is programmed to determine if the motor speed is above a predefined threshold. The predefined motor speed threshold may be between 10% and 20% of the maximum motor speed. In one embodiment, the predefined motor speed threshold is about 15% of the maximum motor speed. For a particular machine design, the threshold motor speed may be obtained through finite element analysis, numerical simulation and other methods available to those skilled in the art.

If the motor speed is above the predefined threshold (block 106=YES), the method 100 is ended. If the motor speed is at or below the predefined threshold (block 106=NO), the method 100 proceeds to block 108. Per block 108, the controller 40 is programmed to synchronize controls task and generate the voltage signal V via a signal generator 202 (see FIG. 4). The voltage signal V has an alternating periodic shape that is injected at the d-axis 34 in the synchronous reference frame (after the current regulator). No voltage is injected at the q-axis 32 in the synchronous reference frame.

Figure 2:
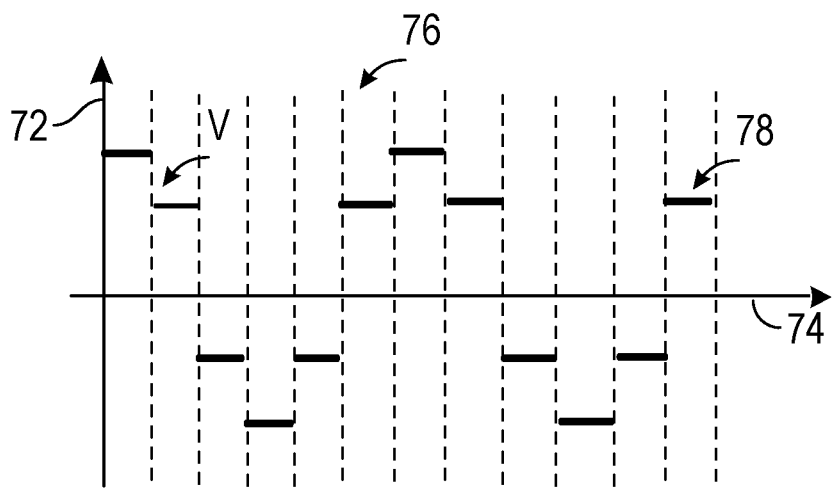
FIG. 2 is a schematic graph showing an example voltage signal employable by the controller of FIG. 1, with the vertical axis indicating amplitude and the horizontal axis indicating time.

FIG. 2 shows an example trace representing the d-axis component of the voltage signal V. The vertical axis 72 indicates amplitude. The horizontal axis 74 indicates time. The voltage signal V is shown for a plurality of control periods 76. The voltage signal V is discontinuous. The voltage signal V has an alternating periodic shape with respective constant segments 78 in each of the plurality of control periods 76, the respective constant segments 78 being discontinuous between the control periods 76. As shown in FIG. 2, adjacent ones of the respective constant segment 78 have different values. In the example shown in FIG. 2, the voltage signal V has a partially sinusoidal shape or outline, however, it is understood that other shapes may be employed.

The d-axis and q-axis components of the voltage signal V may be respectively represented as follows: $v_{dsh}^{r}=V_h \cdot \text{FUNCTION}[n]$ and $v_{qsh}^{r}=0$. Here $V_h$ is the magnitude of the voltage. In some embodiments, the FUNCTION (n) is represented as: [1 (at n=6m), ½ (at n=6m+1), −½ (at n=6m+2), −1 (at n=6m+3), −½ (at n=6m+4), ½ (at n=6m+5), . . . ], where m can be zero and a positive integer and n represents successive ones of the control period 76. In other words, if m=1, the value of the FUNCTION in the control periods 76 (n=6, 7, 8, 9, 10 and 11) is [1, ½, −½, −1, −½, ½]. It is to be understood that other functions may be employed. For example, the value of the FUNCTION in the control periods 76 may be [1 ⅓, −⅓, −1, −⅓, ⅓].

Figure 4:
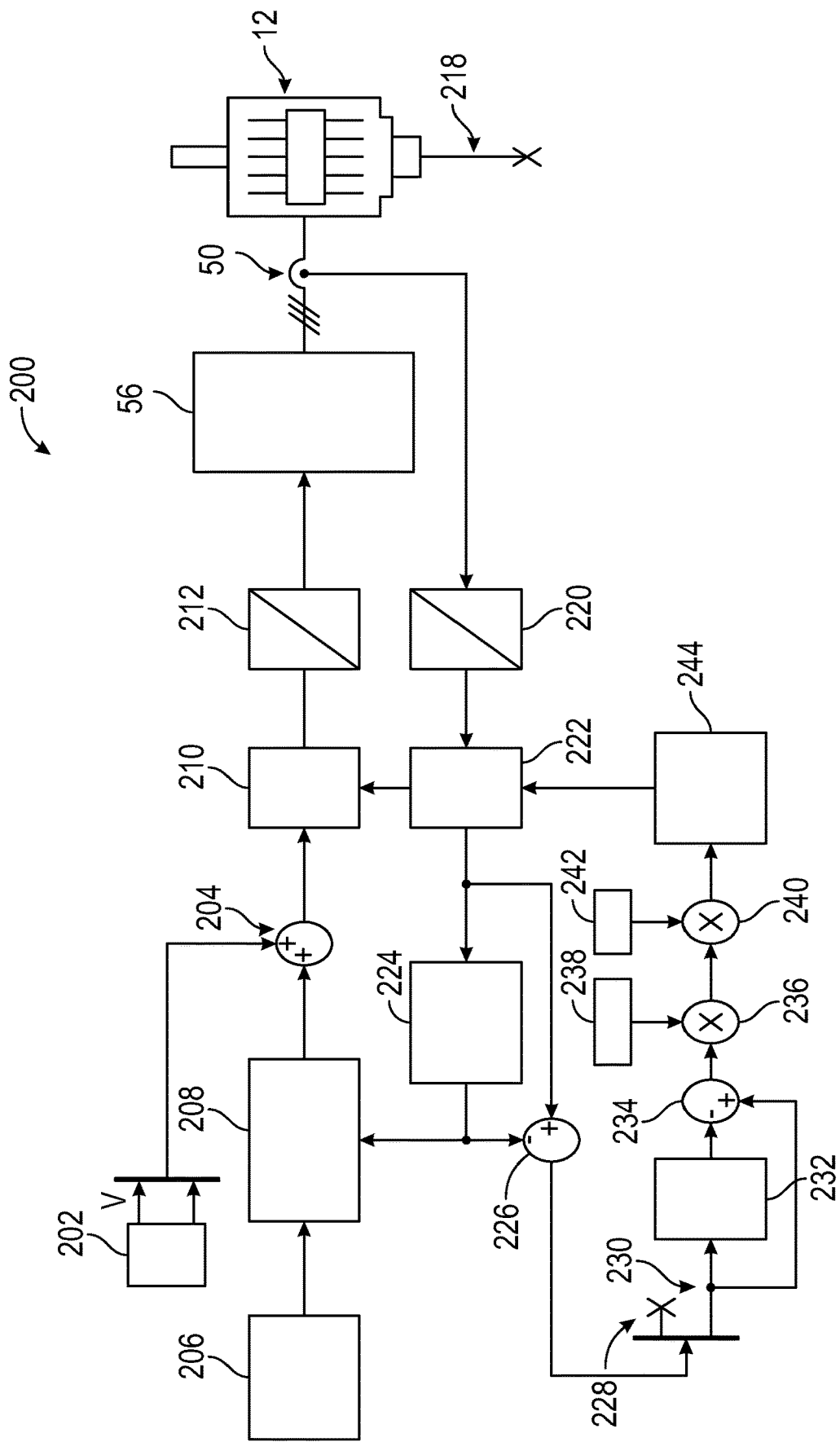
FIG. 4 is a schematic diagram of an example architecture employable by the propulsion system of FIG. 1.

Advancing to block 112, the method 100 includes injecting the voltage signal V. A current sensor 50 (see FIG. 4) is employed to measure the motor current response after the voltage signal V is injected. An example architecture 200 employable by the system 10 is shown in FIG. 4. It is to be understood that other types of layouts or arrangements may be employed. Proceeding to block 112, the controller 40 is programmed to determine the rotor position ($\hat{\theta}_r$) via signal processing, based in part on the motor current response after the voltage signal V is injected, as described below with reference to FIG. 4.

Referring to FIG. 4, the voltage signal V is inputted into a summation junction 204. The voltage signal V is injected at the output of the current (or torque) regulator 208 in order to maintain the fundamental torque control capability.

Referring to FIG. 4, the architecture 200 includes a current reference generator 206 that receives the commanded torque (Te). The current reference generator 206 transmits a current signal (dq axis, in a fundamental frame) to a current regulator 208, which converts it to a voltage component that is inputted into the summation junction 204. The combined voltage from the summation junction 204 is sent to a first position module 210 that converts the signal from a rotating frame to a synchronized frame of reference. Next, a first frame transformer 212 transforms the signal from the d-axis and q-axis frame to an abc frame of reference ($v_{dq}$ to $v_{abc}$). Referring to FIG. 4, the electric motor 12 receives the signal via the PWM inverter 56. The electric motor 12 may include an encoder 218.

The maximum frequency of the voltage signal V can be increased up to one-sixth of the switching or sampling frequency. This is a relatively high frequency that can decouple the interference between fundamental torque control and rotor position estimation properly. The shape of the voltage signal V brings changes in the shape of the motor current response (e.g., phase current) according to the rotor position. The signal processing is done by considering the digital delay in the system 10 when calculating the rotor position. A one-sample delay in pulse width modulation generation is added to affect the shape of the motor current response. The shape of the motor current response is also affected by motor characteristics, the voltage signal V and the rotor position.

Referring to FIG. 4, a current sensor 50 is employed to measure the motor current response and transmit it to a second frame transformer 220 for conversion from the abc frame of reference to the d-axis and q-axis frame ($i_{abc}$ to $i_{dq}$). Next, a second position module 222 converts this signal from a synchronized frame of reference to a rotating frame and inputs it to a junction 226, via a filter 224, which may be a band stop filter, a notch filter or other suitable filter. The d- and q-axis current signal 230 ($i_q$) may be entered into a signal processing module 232, a junction 234, a first operator 236 and a second operator 240 for processing. The d-axis current signal 228 ($i_d$) is not entered into the signal processing module 232. The output of the junction 234 may be represented as:

$$\Delta i_{dqsh}^{r}[n]=i_{dqsh}^{r}[n]-i_{dqsh}^{r}[n-1]$$

where $i_{dqsh}^{r}$ is the injected harmonic signal components of dq-axis current in the synchronous frame of reference and n represents successive ones of the control period 76. The motor current $i_{sig}$ may be represented as follows:

$$i_{sig} = \frac{V_h T_s}{\Sigma L_h^2 - \Delta L_h^2 - L_{dqh}^2}\sqrt{\Delta L_h^2 + L_{dqh}^2} \cdot \sin(2\hat{\theta}_r - 2\phi_\Delta) \quad \text{(equation 1)}$$

This is the output of the first operator 236. Here $i_{sig}$ represents the motor current response, $V_h$ represents the amplitude of the voltage, $T_s$ represents the magnitude of one of the control periods 76, $L_{dh}$, $L_{qh}$ respectively represent the harmonic inductance in the d-axis 34 and the q-axis 32, $L_{qdh}$, $L_{dqh}$ represent the coupling inductances, represents the estimated rotor position and $\phi_\Delta$ represents the rotor disturbance angle. The harmonic inductances may be found using look-up tables.

The first operator 236 and the second operator 240 may receive additional inputs from a signal function module 238 and a current input module 242. The results of the signal processing are sent to an observer module 244. From the signal processing and differential process (considering the time delay), the angle error information may be obtained. The rotor position can be estimated with the state filter or observer module 244 from the angle error. The signal processing to acquire the rotor position angle is carried out from filter 224 through to the observer module 244 and is used to minimize the time delay. The signal containing the angle error information may be linearized when the angle error is not large enough. The injected voltage ($v_{dqsh}^{r}$) may be obtained as follows:

$$v_{dqsh}^{r*} = \begin{bmatrix} V_h \cdot \text{FUNCTION}[n] \\ 0 \end{bmatrix}[n]v_{dqsh}^{r}[n] = \quad \text{(equation 2)}$$

$$v_{dqsh}^{r*}[n-1] \text{ by } PWM \text{ delay},$$

$$\left\{ R(\hat{\theta}_r)\begin{bmatrix} L_{dh} & L_{dqh} \\ L_{qdh} & L_{qh} \end{bmatrix}R(-\hat{\theta}_r) \right\}^{-1} v_{dqsh}^{r}[n-1] = \frac{V_h T_s}{\Sigma L_h^2 - \Delta L_h^2 - L_{dqh}^2} \quad \text{(equation 3)}$$

$$\left\{ \Sigma L_h \begin{bmatrix} 1 \\ 0 \end{bmatrix} + \sqrt{\Delta L_h^2 + L_{dqh}^2} \begin{bmatrix} \cos(2\hat{\theta}_r - 2\phi_\Delta) \\ \sin(2\hat{\theta}_r - 2\phi_\Delta) \end{bmatrix} \right\}.$$

-continued

FUNCTION $[n-2]$, $$\Sigma L_h = \frac{L_{dh} + L_{qh}}{2}, \Delta L_h = \frac{L_{dh} - L_{qh}}{2}, \quad \text{(equation 4)}.$$

$$\text{and} \quad 2\phi_\Delta = a\tan 2(L_{dqh}, -\Delta L_h),$$

In summary, the propulsion system 10 (via execution of method 100) causes injection of a voltage signal V when a sensor fault condition coincides with the motor speed being at or below a predefined motor speed threshold. The voltage signal V has a digitally sampled sinusoidal shape at the d-axis 34 and zero voltage at the q-axis 32 in the synchronous reference frame. The technical advantage here is that the controller 40 can maintain the torque control capability even at zero speed when the position sensor fault occurs. The controller 40 can provide the torque control capability from zero speed to the maximum speed of the electric motor, allowing 'stop-and-go' operation in case of position sensor fault. With a 'stop-and-go' operation, a user can drive the device 11 to a dealership or service center without significant loss of propulsion. Additionally, by enabling sensor-less rotor position estimation, the method 100 may be utilized for improving the performance of position sensor offset learning. This may mitigate incorrect position sensor offsets that may produce bumps in torque generation at control mode changes, e.g., non-six step operation to six-step operation and vice versa.

The controller 40 of FIG. 1 may be an integral portion of, or a separate module operatively connected to, other controllers of the device 11. The controller 40 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart shown in the FIGS. illustrates an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:
1. A propulsion system for a device, comprising:
   an electric motor configured to generate torque to propel the device, the electric motor including a stator and a rotor;
   a position sensor adapted to determine a rotor position of the electric motor;

a controller having a processor and tangible, non-transitory memory on which instructions are recorded for determining the rotor position when a sensor fault condition in the position sensor is detected;

wherein the controller is adapted to:

determine a motor speed of the electric motor;

selectively command injection of a voltage signal in a direct magnetic axis in a synchronous reference frame when the motor speed is below a predefined motor speed threshold and the sensor fault condition is detected; and estimate the rotor position based in part on a motor current response to the voltage signal;

wherein the voltage signal is defined by an alternating periodic shape with respective constant segments in each of a plurality of control periods, the respective constant segments being discontinuous between the plurality of control periods.

2. The propulsion system of claim 1, wherein:

the voltage signal has a zero-magnitude signal in a quadrature magnetic axis in the synchronous reference frame; and operation of the electric motor is controlled based in part on the rotor position.

3. The propulsion system of claim 1, wherein the predefined motor speed threshold is between 10% and 20% of a maximum speed of the electric motor.

4. The propulsion system of claim 1, wherein the predefined motor speed threshold is about 15% of a maximum speed of the electric motor.

5. The propulsion system of claim 1, wherein the electric motor defines a switching frequency, and a maximum frequency of the voltage signal is one-sixth of the switching frequency.

6. The propulsion system of claim 1, further comprising:

a current sensor in communication with the controller and adapted to measure the motor current response.

7. The propulsion system of claim 6, wherein the controller is adapted to add a one-sample delay in pulse width modulation generation in the electric motor, thereby affecting the motor current response.

8. The propulsion system of claim 1, wherein the alternating periodic shape of the voltage signal has a partially sinusoidal shape.

9. The propulsion system of claim 1, further comprising:

a filter operatively connected to the electric motor and adapted to receive the motor current response, the filter being a band stop filter and/or a notch filter.

10. A method of operating a propulsion system in a device, the propulsion system having an electric motor with a stator, a rotor, a position sensor, and a controller having a processor and tangible, non-transitory memory, the method comprising:

determining if a sensor fault condition in the position sensor has been detected;

determining a motor speed of the electric motor;

commanding injection of a voltage signal in a direct magnetic axis of a synchronous reference frame, when the motor speed is below a predefined motor speed threshold and the sensor fault condition is detected;

selecting the voltage signal to have an alternating periodic shape with respective constant segments in each of a plurality of control periods, the respective constant segments being discontinuous between the plurality of control periods; and estimating the rotor position based in part on a motor current response to the voltage signal.

11. The method of claim 10, further comprising:

selecting the voltage signal to have a zero-magnitude signal in a quadrature magnetic axis in the synchronous reference frame.

12. The method of claim 10, further comprising:

selecting the predefined motor speed threshold to be between 10% and 20% of a maximum speed of the electric motor.

13. The method of claim 10, further comprising:

selecting the predefined motor speed threshold to be about 15% of a maximum speed of the electric motor.

14. The method of claim 10, wherein the electric motor defines a switching frequency, further comprising:

selecting a maximum frequency of the voltage signal to be one-sixth of the switching frequency.

15. The method of claim 10, further comprising:

measuring the motor current response via a current sensor in communication with the controller.

16. The method of claim 15, further comprising:

adding a one-sample delay in pulse width modulation generation in the electric motor, thereby affecting the motor current response.

17. The method of claim 10, further comprising:

selecting the voltage signal in the direct magnetic axis based in part on a FUNCTION (n) represented as: [1 (at n=6m), ½ (at n=6m+1), −½ (at n=6m+2), −1 (at n=6m+3), −½ (at n=6m+4), ½ (at n=6m+5), . . . ], where m represents a positive integer and/or zero and n represents each control period of the voltage signal.

18. The method of claim 10, further comprising:

operatively connecting a filter to the electric motor, the filter being a band stop filter and/or a notch filter adapted to receive the motor current response.

19. A propulsion system for a device, comprising:

an electric motor configured to generate torque to propel the device, the electric motor including a stator and a rotor;

a position sensor adapted to determine a rotor position of the electric motor;

a controller having a processor and tangible, non-transitory memory on which instructions are recorded for determining the rotor position when a sensor fault condition is detected;

wherein the controller is adapted to:

determine a motor speed of the electric motor;

selectively command injection of a voltage signal in a direct magnetic axis in a synchronous reference frame when the motor speed is below a predefined motor speed threshold and the sensor fault condition is detected; and estimate the rotor position based in part on a motor current response to the voltage signal;

wherein the voltage signal is defined by an alternating periodic shape with respective constant segments in each of a plurality of control periods, the voltage signal having a zero-magnitude signal in a quadrature magnetic axis in the synchronous reference frame; and wherein the alternating periodic shape has a partially sinusoidal shape, the respective constant segments being discontinuous between the plurality of control periods.

* * * * *